United States Patent [19]
Eguchi

[11] 3,917,415

[45] Nov. 4, 1975

[54] APPARATUS AND METHOD FOR REPRODUCING RECORDED COLOR VIDEO SIGNALS

[75] Inventor: Takeo Eguchi, Kanagawa, Japan

[73] Assignee: Sony Corporation, Tokyo, Japan

[22] Filed: Oct. 16, 1974

[21] Appl. No.: 515,309

[30] Foreign Application Priority Data

Oct. 16, 1973 Japan .............................. 48-116229

[52] U.S. Cl. ............... 358/4; 358/11; 178/DIG. 24; 325/442

[51] Int. Cl.[2] ... H04N 5/76; H04N 9/42; H04B 1/26

[58] Field of Search ......................... 358/4, 8, 9, 11; 178/DIG. 24; 360/36, 37, 26, 8; 325/442

[56] References Cited

UNITED STATES PATENTS

| | | | |
|---|---|---|---|
| 3,723,638 | 3/1973 | Fujita | 358/8 |
| 3,730,983 | 5/1973 | Numakura et al. | 358/4 |
| 3,757,034 | 9/1973 | Fujita | 358/4 |
| 3,845,237 | 10/1974 | Yamakawa | 358/4 |

*Primary Examiner*—Robert L. Griffin
*Assistant Examiner*—R. John Godfrey
*Attorney, Agent, or Firm*—Lewis H. Eslinger; Alvin Sinderbrand

[57] ABSTRACT

In selectively reproducing video signals, such as NTSC and PAL signals, which have been recorded on respective magnetic tapes or other record media with different line frequencies and with different color sub-carrier frequencies for the respective chrominance components; the chrominance and luminance components are separated from the video signals reproduced from a selected tape or other record medium, and the chrominance component is acted upon, in a frequency converter, by a frequency converting signal which converts the color sub-carrier to a predetermined fixed frequency irrespective of whether the reproduced video signals were originally NTSC or PAL signals so that a single monitor may be employed for visually displaying recorded NTSC and PAL video signals. The aforementioned frequency converting signal is provided by combining a first signal, as from a fixed oscillator, having the predetermined fixed frequency, a second signal having a frequency which is a predetermined multiple of the line frequency of the NTSC or PAL signals being reproduced, and a third signal, for example, from a variable frequency oscillator, which is controlled to have a frequency which is the difference between the color sub-carrier frequency of the reproduced NTSC or PAL video signals and the frequency of the second signal, that is, the predetermined multiple of the line frequency.

13 Claims, 1 Drawing Figure

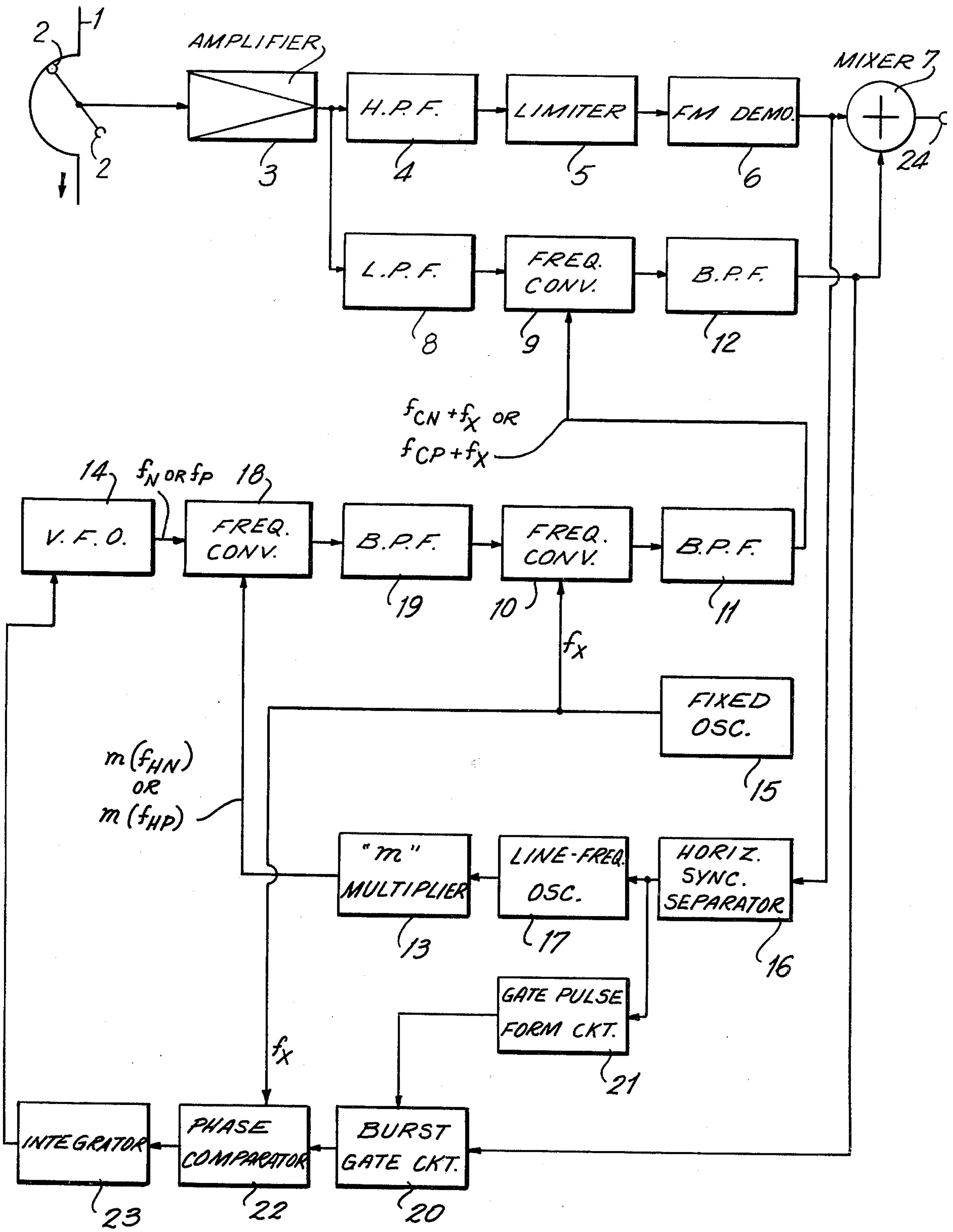
AMPLIFIER
H.P.F.
LIMITER
FM DEMO.
MIXER 7
L.P.F.
FREQ. CONV.
B.P.F.
$f_{CN}+f_X$ OR $f_{CP}+f_X$
V.F.O.
$f_N$ OR $f_P$
FREQ. CONV.
B.P.F.
FREQ. CONV.
B.P.F.
$f_X$
FIXED OSC.
$m(f_{HN})$ OR $m(f_{HP})$
"m" MULTIPLIER
LINE-FREQ. OSC.
HORIZ. SYNC. SEPARATOR
GATE PULSE FORM CKT.
$f_X$
INTEGRATOR
PHASE COMPARATOR
BURST GATE CKT.

APPARATUS AND METHOD FOR REPRODUCING RECORDED COLOR VIDEO SIGNALS

BACKGROUND OF THE INVENTION

1. Field of the Invention

This invention relates generally to the recording and reproducing of color TV or video signals, and more particularly to a method and apparatus by which recorded color video signals according to different standards, such as, NTSC and PAL color video signals, may be reproduced for visual display on a single monitor or color television receiver.

2. Description of the Prior Art

It is well known to record color television or video signals on magnetic tape by means of an apparatus known as a video tape recorder or VTR. Such apparatus usually has one or more rotary magnetic heads associated with a guide drum around which the magnetic tape is wrapped along a section of a helical path. As the tape is moved longitudinally along such path, the heads rotate and record television signal information on a series of parallel tracks disposed at an angle to the longitudinal direction of the tape. The same apparatus may be used to play back or reproduce previously recorded information by means of heads that follow the recorded tracks.

The color television signals to be recorded are divisible both in frequency and in time. In terms of frequency they are divided into the luminance signal components, which occupy the relatively low frequency portion of the complete color television signal band, and the chrominance signal components and burst signals that occupy the relatively high frequency portions of the band. In terms of time, television signals are divided into field intervals, two of which make up a frame interval, and line intervals. Each line interval includes a blanking interval during which synchronization signals are transmitted to control the scanning apparatus of a color television receiver, and burst signals to synchronize the operation of sub-carrier signals generated in the television receiver or monitor.

It is further well known for example, as disclosed in U.S. Pat. No. 3,580,980, issued May 25, 1971, and having a common assignee herewith, that, when recording color television or video signals, as aforesaid, it is preferable to separate the luminance and chrominance components prior to recording, whereupon, the luminance component is used to frequency or phase modulate an oscillator, and thus provide a frequency or phase modulated luminance signal, while the band of signals including the chrominance component and burst signals is frequency-converted to a lower frequency band, that is, the color sub-carrier has its frequency converted to a lower value. Then, the frequency or phase modulated luminance signal and the frequency converted chrominance signal are combined to provide the video signal which is actually recorded on the magnetic tape.

When a color video signal recorded on a magnetic tape, as described above, is played back or reproduced, the chrominance and luminance components of the reproduced video signal are separated, whereupon the color subcarrier frequency of the chrominance component is reconverted to its original value, the frequency or phase modulated luminance component is demodulated, and the frequency reconverted chrominance component and demodulated luminance component are recombined to reproduce substantially the original video signal. Although the foregoing scheme for recording and reproducing color video signals is intended to best utilize the characteristics of the magnetic recording and reproducing heads for obtaining reproduced television pictures of good quality, it has been found that the second harmonic of the converted color sub-carrier frequency may, upon reproduction of the recorded video signal, produce interference phenomena in thn displayed television picture or image. However, it is known, for example, as disclosed in detail in U.S. Pat. No. 3,730,983, issued May 1, 1973, and having a common assignee herewith, that such interference phenomena in the reproduced picture may be avoided by selecting the converted color sub-carrier frequency so as to have a particular relationship to the horizontal or line frequency of the video signal being recorded.

More specifically, when recording color video signals of the NTSC type, the frequency of the color sub-carrier for the chrominance component is converted from its standard frequency of approximately 3.58 MHz to a lower frequency $f_{CN}$ which satisfies the below equation:

$$2f_{CN} = (n-½)f_{HN} \quad (1)$$

in which $f_{HN}$ is the line or horizontal frequency of the NTSC color video signal and $n$ is a positive integer. Thus, the second harmonic of the lower frequency to which the color sub-carrier is converted prior to recording has a half-line offset or interleaved relationship in respect to the line frequency. On the other hand, when recording color video signals of the PAL type, the frequency of the color sub-carrier for the chrominance component is converted from the standard frequency of approximately 4.434 MHz to a lower frequency $f_{CP}$ which satisfies the below equation:

$$2f_{CP} = (n-¼)f_{HP} \quad (2)$$

in which $f_{HP}$ is the line or horizontal frequency of the PAL color video signal and $n$ is again a positive integer. Thus, the second harmonic of the lower frequency to which the color sub-carrier is converted prior to recording has a quarter-line offset in respect to the line frequency.

The line frequency $f_{HN}$ in the case of the NTSC color video signals is standardized at 15.734 KHz, and the line frequency $f_{HP}$ in the case of PAL color video signals is standardized at 15.625 KHz. Therefore, if the value of $n$ is selected to be 88, by way of example, equations (1) and (2) can be solved to provide:

$$f_{CN} = 688.363 \text{ KHz}$$
$$f_{CP} = 685.547 \text{ KHz}$$

Accordingly, in existing apparatus intended to be used for recording and reproducing NTSC color video signals, such signals may be recorded with the frequency of the color sub-carrier for the chrominance component converted to 688.363 KHz from the original frequency of 3.58 MHz. In reproducing such recorded signals, the color sub-carrier of the reproduced chrominance component is reconverted from its converted frequency of 688.363 KHz to its original frequency of 3.58 MHz in a frequency reconverter by means of a frequency converting signal which is a combination of the outputs from a fixed oscillator having the original color sub-carrier frequency of 3.58 MHz and from a variable frequency oscillator having a center frequency substantially equal to the converted color sub-carrier frequency of 688.363 KHz. In order to compensate for time fluctuations in the reproduced sub-carrier and to eliminate phase-errors in the reproduced chrominance component, a burst signal is separated from the chrominance component issuing from the frequency reconverter and is compared with the signal from the fixed oscillator to provide a control signal corresponding to any deviation between the compared signals for controlling the variable frequency oscillator. Thus, even though the color sub-carrier of the reproduced chrominance component may have frequency fluctuations, the variable frequency oscillator is made to respond to such fluctuations so that the chrominance component issuing from the frequency reconverter will have a color sub-carrier frequency that is stably maintained at the sub-carrier frequency of 3.58 MHz for NTSC signals.

Existing apparatus intended for recording and reproducing PAL color video signals are generally similar to the above described apparatus for NTSC signals except that, in this case, the frequency of the color sub-carrier for the chrominance component is converted to 685.547 KHz, from the original frequency of 4.434 MHz, for the purpose of recording. Then, in reproducing the recorded PAL signals, the color sub-carrier of the reproduced chrominance component is reconverted from its converted frequency of 685.547 KHz to its original frequency of 4.434 MHz in a frequency reconverter by means of a frequency converting signal which is a combination of the output of a fixed oscillator having a frequency of 4.434 MHz and the output of a variable frequency oscillator having a center frequency of 685.547 KHz.

In recent years, video tape cassettes that are prerecorded with either NTSC or PAL color video signals have been gaining increasing popularity. Originally, the NTSC and PAL color video signals prerecorded on such video tape cassettes were reproduced as described so as to restore the color sub-carrier frequencies to their respective standards of 3.58 MHz and 4.434 MHz, with the result that different monitors or TV image display devices were required for the visual display of the reproduced NTSC and PAL color video signals, respectively.

In order to avoid the necessity of providing different monitors for the visual display of color video signals reproduced from tapes recorded with NTSC and PAL signals, respectively, it has been proposed to provide an apparatus which, in its reproducing mode, is operative to frequency reconvert the color sub-carrier of the reproduced chrominance component to a frequency of 4.434 MHz whether the chrominance component was recorded with a color sub-carrier frequency $f_{CP}$ of, for example, 685.547 KHz, in the case of PAL signals, or with a color sub-carrier frequency $f_{CN}$ of, for example, 688.363 KHz, in the case of NTSC signals. Since the reproduced NTSC and PAL signals finally have the same color sub-carrier frequency, a single or common monitor can be provided for their visual display. In order to achieve the foregoing, the frequency reconverting of the reproduced chrominance component is effected by a frequency converting signal which is a combination of the output of a fixed oscillator having a frequency of 4.434 MHz and the output of a variable frequency oscillator which provides the frequency $f_{CN}$, for example, 688.363 KHz, when reproducing NTSC signals, and the frequency $f_{CP}$, for example, 685.547 KHz, when reproducing PAL signals. However, it will be seen that, if the NTSC and PAL signals are recorded with color sub-carrier frequencies $f_{CN}$ and $f_{CP}$ of 688.363 KHz and 685.547 KHz, respectively, the difference therebetween is 2.816 KHz and it is almost impossible, or at least very difficult to provide a variable frequency oscillator having such a wide range of frequency variation. Therefore, in practice, the existing color video signal reproducing apparatus for displaying recorded NTSC and PAL signals by way of a single or common monitor has included two variable frequency oscillators respectively having $f_{CN}$ and $f_{CP}$ as their center frequencies, and which are selectively switched into the signal reproducing circuits when reproducing NTSC and PAL signals, respectively. Thus, the circuits of the apparatus are undesirably complex and, moreover, the user of the apparatus has to manually switch or adapt the circuits of the apparatus for the playback or reproducing of video tape cassettes prerecorded with NTSC or PAL signals.

In still another proposed apparatus for recording and reproducing NTSC or PAL color video signals, for example, as described in detail in U.S. patent application Ser. No. 327,614, filed Jan. 26, 1973, and which will issue as U.S. Pat. No. 3,845,237 on Oct. 29, 1974 and has a common assignee herewith, the converted color sub-carrier frequency, for example, of 767 KHz, is the same for the recording of either NTSC or PAL signals. When reproducing such recorded NTSC or PAL color video signals, the color sub-carrier frequency of the reproduced chrominance component is reconverted to a fixed frequency, for example, the color sub-carrier frequency of 4.434 MHz which is standard for PAL signals. Thereafter, the demodulated luminance component and the frequency reconverted chrominance component of the reproduced color video signals are combined to provide a composite signal which can be displayed by a single monitor whether the original video signals were NTSC or PAL signals. The foregoing arrangement has the disadvantage of requiring that the NTSC or PAL signals be recorded with their color subcarriers frequency converted to the same frequency, for example, 767 KHz, as mentioned above. Although such converted color sub-carrier frequency may satisfy equation (1) above when NTSC signals are being recorded, it will not precisely satisfy equation (2) above when PAL signals are being recorded and, therefore, one or the other of the NTSC and PAL signals will be recorded under conditions that are not absolutely ideal for avoiding the previously described interference phenomena in the displayed picture. Further, the apparatus disclosed in U.S. Pat. No. 3,845,237, for reproducing NTSC or PAL color video signals and displaying the corresponding pictures on a single monitor can only be used if the NTSC or PAL signals have been recorded precisely as disclosed in that patent, that is, with the same converted color sub-carrier frequency. Thus, such reproducing apparatus cannot be employed in connection with video tape cassettes that have been prerecorded with NTSC and PAL color video signals, respectively, which, as recorded, have converted color sub-carrier frequencies that are different so as to be most suitably related to the respective line frequencies as specified in equations (1) and (2) above.

OBJECTS AND SUMMARY OF THE INVENTION

Accordingly, it is an object of this invention to provide an improved apparatus and method by which NTSC and PAL color video signals recorded with different respective color sub-carrier frequencies may be reproduced selectively so as to be suitable for visual display by a single or common monitor.

More specifically, it is an object of the invention to provide an apparatus and method, as aforesaid, with which recorded NTSC and PAL color video signals, for example, on respective pre-recorded tape casettes, can be conveniently reproduced without requiring manual switching or selection of the apparatus by the operator so as to adapt the apparatus for the particular type of color video signals to be reproduced.

A futher object is to provide an apparatus and method, as aforesaid, in which the reproduced chrominance component has its color sub-carrier frequency reconverted to a predetermined frequency, for example, the standard color sub-carrier frequency for PAL signals, whether the recorded signals were of the NTSC or PAL type, and in which such reconverting of the color sub-carrier frequency is achieved by a relatively simple circuit arrangement of components which are the same for reproducing both NTSC and PAL signals.

In accordance with an aspect of the invention, color video signals, such as NTSC and PAL signals, which have been recorded on respective magnetic tapes or other record media with different line frequencies and with different color sub-carrier frequencies which are preferably converted to values substantially lower than the standard color sub-carrier frequencies for the types of color video signals in question, are selectively reproduced, whereupon the reproduced color video signals are separated into their luminance and chrominance components and the color sub-carrier frequency of the chrominance component is reconverted to a predetermined fixed frequency. The reconverting of the color sub-carrier to such predetermined fixed frequency, for example, the standard color sub-carrier frequency of 4.474 MHz for PAL color video signals, is effected by a frequency converting signal which is obtained by combining a first signal, as from a fixed frequency oscillator, having the predetermined fixed frequency, a second signal having a frequency which is a predetermined multiple of the line frequency of the NTSC or PAL signals being reproduced, and a third signal, preferably from a variable frequency oscillator which is controlled to have a frequency which is the difference between the color sub-carrier frequency of the reproduced NTSC or PAL color video signals and the frequency of the second signal, that is, the predetermined multiple of the line frequency of the reproduced signals.

The above, and other objects, features and advantages of the invention, will be apparent from the following detailed description of an illustrative embodiment thereof which is to be read in connection with the accompanying drawing.

BRIEF DESCRIPTION OF THE DRAWING

The single view of the drawing is a block diagram showing an apparatus according to an embodiment of this invention by which either NTSC or PAL color video signals recorded on respective magnetic tapes may be reproduced so as to permit the display thereof on a single or common monitor.

DESCRIPTION OF A PREFERRED EMBODIMENT

Referring to the drawing in detail, the reference numeral 1 identifies a magnetic tape which may be contained in a tape cassette and which has been prerecorded with color video signals in a suitable apparatus (not shown). In such recording apparatus which will only be generally described herein to the extent necessary for complete understanding of the present invention, one or more rotary recording heads are associated with a guide drum around which the tape 1 is wrapped along a section of a helical path so that, as the tape is moved longitudinally along such path and the head or heads are rotated, color video signal information applied to the heads is recorded in a series of parallel record tracks extending obliquely across the tape. The speed of rotation of the recording head or heads and the speed of longitudinal movement of the tape are suitably controlled in respect to the color video signals being recorded so that signal information corresponding to a single field or frame interval of such color video signals is recorded in each of the obliquely extending record tracks.

In recording the color video signals, the luminance and chrominance components thereof are separated, whereupon, the luminance component is employed to frequency modulate a suitable carrier and provide a frequency modulated luminance component, while the band of signals including the chrominance component and the burst signals is frequency converted to a lower frequency band, that is the color sub-carrier has its frequency converted to a lower value. Then, the frequency modulated luminance component and the frequency converted chrominance component are combined to provide the composite signal or information which is actually recorded on tape 1.

When NTSC color video signals are being recorded, the color sub-carrier of the chrominance component is converted to a frequency $f_{CN}$ which satisfies equation (1) above, that is, $$f_{CN} = ½(n-½)f_{HN}$$

as specifically disclosed in U.S. Pat. No. 3,730,983. On the other hand, when PAL color video signals are being recorded, the color sub-carrier of the chrominance component thereof is frequency converted to a frequency $f_{CP}$ which satisfies equation (2) above, that is, $$f_{CP} = ½(n-¼)f_{HP}$$

Therefore, if the positive integer $n$ has a value of 88, by way of example, and noting that the line frequencies $f_{HN}$ and $f_{HP}$ of the NTSC and PAL signals are respectively 15.734 KHz and 15.625 KHz, then it will be noted that, when recording NTSC color video signals, the color sub-carrier frequency will be converted from its original value of about 3.58 MHz to a converted frequency $f_{CN}$ of 688.363 KHz, and when recording PAL color video signals, the color sub-carrier frequency will be converted from its original value of about 4.434 MHz to a converted frequency $f_{CP}$ of 685.547 KHz.

In view of the above, if tape 1 selected for playback or reproducing according to this invention has been recorded with NTSC color video signals, such recorded signals will have a line frequency of 15.734 KHz, a field frequency of 60 Hz and a color sub-carrier frequency $f_{CN}$=½$(n-½)f_{HN}$, for example, 688.363 KHz. On the other hand, if the tape 1 selected for playback or reproducing according to this invention has been recorded with PAL color video signals, such recorded signals will have a line frequency of 15.625 KHz, a field frequency of 50 Hz and a color sub-carrier frequency $f_{CP}$=½$(n-¼)f_{HP}$, for example, 685.547 KHz.

Referring again to the drawing, it will be seen that, in the apparatus according to the present invention for reproducing either NTSC or PAL color video signals previously recorded, as described above, on a selected tape 1, two substantially diametrically opposed rotary magnetic reproducing heads 2 are associated with a guide drum (not shown) about which the selected tape 1 is wrapped along a section of a helical path. A suitable drive mechanism (not shown), for example, as disclosed in U.S. Pat. No. 3,845,237, is provided for rotating rotary heads 2 and for longitudinally moving the selected tape 1, as by a rotated capstan, at respective speeds which correspond to the nature of the color video signals recorded on the selected tape. Thus, for example, when the selected tape 1 has NTSC color video signals recorded thereon, with each oblique record track on the tape containing a field interval of such signals, heads 2 are rotated at a speed of 30 R.P.S. On the other hand, if the selected tape 1 has PAL color video signals recorded thereon, heads 2 are rotated at a speed of 25 R.P.S. In either case, the speed of movement of the tape is conventionally controlled so that the heads 2 will alternately scan the successive oblique record tracks on the selected tape 1 for reproducing the signal information recorded therein.

The signals alternately reproduced by rotary heads 2 are passed through an amplifier 3 to a high-pass filter 4 which separates the frequency modulated luminance component. The separated frequency modulated luminance component is passed through a limiter 5 to a frequency demodulator 6 which provides a demodulated luminance component applied to a mixer 7.

The output of amplifier 3 is also supplied to a lowpass filter 8 which separates the frequency converted chrominance component, that is, the chrominance component having the color sub-carrier frequency $f_{CN}$ when the tape 1 is recorded with NTSC signals, or the color sub-carrier frequency $f_{CP}$ when the tape 1 is recorded with PAL signals. The separated chrominance component of the reproduced signals is supplied to a frequency converter 9 in which the color sub-carrier frequency $f_{CN}$ or $f_{CP}$ is reconverted, as hereinafter described in detail, to a fixed color sub-carrier frequency $f'_x$ which is preferably the same as the original color sub-carrier frequency of the PAL signals, that is, about 4,434 MHz. The chrominance component having its color sub-carrier frequency reconverted to the fixed value $f'_x$ in frequency converter 9 is supplied through band pass filter 12 to the mixer 7 where it is combined with the demodulated luminance component to provide a composite or combined signal at an output terminal 24.

In accordance with this invention, the frequency converting signal applied to frequency converter 9 for causing the latter to reconvert the color subcarrier frequency of the chrominance component to the fixed frequency $f'_x$ from either the converted frequency $f_{CN}$ for the NTSC signals, or the converted frequency $f_{CP}$ for the PAL signals, is a combination of a first signal having a predetermined fixed frequency $f_x$ which is equal to the desired value of $f'_x$, a second signal having a frequency $m(f_{HN})$ or $m(f_{HP})$, that is, a frequency which is a predetermined multiple m of the line frequency $f_{HN}$ or $f_{HP}$ of the NTSC or PAL signals being reproduced, and a third signal having a frequency $f_N$ or $f_P$ which is the difference between the converted color sub-carrier frequency $f_{CN}$ or $f_{CP}$ of the recorded NTSC or PAL signals being reproduced and the second signal $m(f_{HN})$ or $m(f$HP), respectively, that is, the predetermined multiple of the respective line frequency.

In the illustrated reproducing apparatus according to this invention, the first signal having the predetermined fixed frequency $f_x$, preferably of 4.434 MHz, is obtained from a fixed oscillator 15. Further, the demodulated luminance component is applied from demodulator 6 to a horizontal synchronizing signal separator 16 so that the latter separates the horizontal or line synchronizing signal at the frequency $f_{HN}$ or $f_{HP}$ to drive a line frequency oscillator 17 which thereby produces a sine wave signal having the line frequency $f_{HN}$ or $f_{HP}$. Such sine wave signal is supplied to a multiplier 13 so as to have its frequency $f_{HN}$ or $f_{HP}$ multiplied by the multiple $m$ and thereby produce the above mentioned second signal $m(f_{HN})$ or $m(f_{HP})$. The multiple m is selected to be a positive integer which approximately satisfies the following equation:

$$m \cong \frac{f_{CN}-f_{CP}}{f_{HN}-f_{HP}} \quad (3)$$

Thus, in the case of $f_{CN} = 688.363$ KHz, $f_{CP} = 685.547$ KHz, $f_{HN} = 15.734$ KHz and $f_{HP} = 15.625$ KHz, as in the example given above, the difference between the converted color sub-carrier frequencies $f_{CN}$ and $f_{CP}$ for the recorded NTSC and PAL signals, divided by the difference between the respective line frequencies $f_{HN}$ and $f_{HP}$ is actually 25.83. Although the closest positive integer to that value is 26, the multiple $m = 25$ makes it possible to simplify the circuit of multiplier 13 and is therefore adopted.

Accordingly, when the tape 1 has NTSC signals recorded thereon, the output frequency $m(f_{HN})$ from multiplier 13 has a value of 393.350 KHz, assuming that $m = 25$ as above. On the other hand, when the tape 1 is recorded with PAL signals, the output frequency $m(f_{HP})$ from multiplier 13 is 390.625 KHz. It will be seen that the difference between $m(f_{HN})$ and $m(f_{HP})$, that is, 2.725 KHz in the example above, is very close to the difference of 2.816 KHz between $f_{CN}$=688.363 KHz and $f_{CP}$=685.547 KHz.

The previously mentioned third signal $f_N$ or $f_P$ is derived from a variable frequency oscillator 14 having a center frequency which is intermediate $f_N = f_{CN} - m(f_{HN})$, that is, the difference between the converted color sub-carrier frequency and the multiple of the line frequency for the recorded NTSC signals, and $f_P = f_{CP} - m(f_{HP})$, that is, the difference between the converted color sub-carrier frequency and the multiple of the line frequency for the recorded PAL signals. In the example given above, $f_{CN} - m(f_{HN})$=295.013 KHz and $f_{CP} - m(f_{HP})$=294.922 KHz, from which it follows that variable frequency oscillator 14 may be conveniently selected to have a center frequency of 295 KHz.

Further, as shown, the signals $f_N$ or $f_P$ from variable frequency oscillator 14 is applied to a frequency converter 18 in which it is converted by the signal $m(f_{HN})$ or $m(f_{HP})$ from multiplier 13, so as to obtain the frequency $f_N + m(f_{HN})$ or $f_P + m(f_{HP})$, respectively. Since $f_N = f_{CN} - m(f_{HN})$ and $f_P = f_{CP} - m(f_{HP})$, the frequency of the converted signal obtained from frequency converter 18 can be written as $f_{CN}$ or $f_{CP}$ depending on whether the signals recorded on tape 1 are NTSC or PAL signals, respectively.

The output signal from frequency converter 18 having the frequency $f_{CN}$ or $f_{CP}$ is applied through a band pass filter 19 to a frequency converter 10 which also receives the first signal from fixed oscillator 15 at the predetermined fixed frequency $f_x$ so that the output signal from frequency converter 10 has the frequency $f_{CN} + f_x$ or $f_{CP} + f_x$. Such output from frequency converter 10 is applied through a band pass filter 11 to the first mentioned frequency converter 9 for frequency reconverting the color sub-carrier frequency of the reproduced video signals from the frequency $f_{CN}$ or $f_{CP}$, with which such signals were recorded on the tape 1, to the frequency $f'_x$ which is to be maintained equal to the predetermined fixed frequency $f_x$.

In order to ensure that the signal from variable frequency oscillator 14 will have the frequencies $f_N$ and $f_P$ when reproducing recorded NTSC and PAL signals, respectively, whereby to provide the frequency reconverted chrominance component supplied to mixer 7 with the color sub-carrier frequency $f'_x = f_x$, that is, 4.434 MHz in the described example, in each case, the output signal from band pass filter 12 having the frequency $f'_x$ is also applied to a burst gate circuit 20 which is gated by pulses from a gate pulse forming circuit 21 controlled by the horizontal or line synchronizing signals from separator 16. Thus, circuit 20 is gated during each line interval to supply a burst pulse at the frequency $f'_x$ to a phase comparator 22 which also receives the signal from fixed oscillator 15 at the frequency $f_x$. The comparator 22 compares the phase of the signal having the fixed frequency $f_x$ with the phase of the gated burst pulse having the frequency $f'_x$ and, in response to deviations therebetween, provides a corresponding signal supplied to an integrator 23 which produces a control signal for regulating the output frequency of the variable frequency oscillator 14 in the direction to bring the frequency $f'_x$ into equality with the fixed frequency $f_x$.

It will be apparent that the above described circuit controls variable frequency oscillator 14 so as to tend to make the frequency $f'_x$ equal to the fixed frequency $f_x$, and that such equality is achieved, when reproducing NTSC signals recorded on tape 1, only with the output frequency $f_N = f_{CN} - m(f_{HN})$ and, when reproducing PAL signals recorded on the tape 1, only with the output frequency $f_P = f_{CP} - m(f_{HP})$. Since in the example given above, $f_N$ and $f_P$ are respectively equal to 295.013 KHz and 294.922 KHz, it will be seen that the necessary range of variation of the output frequency from variable frequency oscillator 14 is only about 0.091 KHz which is easily achievable by a single variable oscillator. Further, it will be seen that such small frequency range 0.091 KHz of variable frequency oscillator 14 is effective to provide the combined or composite output signal at terminal 24 with the fixed color sub-carrier frequency of 4.434 MHz even though the color video signals to be reproduced from the tape 1 are recorded on the latter with color sub-carrier frequencies $f_{CN}$ or $f_{CP}$ of 688.363 KHz or 685.547 KHz, that is, having a difference of 2.816 KHz.

Although the combined or composite output signals obtained at output terminal 24 when reproducing NTSC and PAL signals recorded on respective tapes will have characteristically different field and line frequencies and other well known differences, such as, in respect to the phase relation of the quadrature modulation axes and of the burst signal, the fact that the reproduced NTSC and PAL signals issuing from terminal 24 will have the same color sub-carrier frequencies, for example, of 4.434 MHz, makes it possible to display the same by means of a single existing monitor or color image display device (not shown) which may be of the type disclosed in detail in U.S. Pat. No. 3,845,237. Further, by combining the output $m(f_{HN})$ or $m(f_{HP})$ from multiplier 13, which output has a range of variation approximately equal to the difference between $f_{CN}$ and $f_{CP}$, with the output from variable frequency oscillator 14, the latter can have a relatively small range of frequency variation to provide the desired frequency $f_{CN}$ or $f_{CP}$ at the output of frequency converter 18. Thus, it will be seen that the NTSC and PAL color video signals can be recorded on respective magnetic tapes or other record media with different color sub-carrier frequencies that are most desirable for each type of signal, and that, in reproducing such recorded signals according to this invention, the different color sub-carrier frequencies are reconverted to a single frequency by means of a circuit, as shown, which includes only a single variable frequency oscillator of relatively small frequency range.

Having described a specific embodiment of the invention with reference to the accompanying drawing, it is to be understood that the invention is not limited to that precise embodiment, and that various changes and modifications may be effected therein by one skilled in the art without departing from the scope or spirit of the invention as defined in the appended claims.

What is claimed is:

1. An apparatus for selectively reproducing color video signals having luminance and chrominance components and which have been recorded on respective record media with different line frequencies and with different color sub-carrier frequencies for the respective chrominance components; comprising means for reproducing video signals recorded on a selected one of said record media, means for separating the luminance and chrominance components of the reproduced video signals, frequency converting means receiving the separated chrominance component of said reproduced video signals, fixed oscillator means for providing a first signal with a predetermined fixed frequency, means for providing a second signal with a frequency which is a predetermined multiple of said line frequency of the video signals being reproduced, a variable frequency oscillator, means controlling said variable frequency oscillator to provide from the latter a third signal with a frequency which is the difference between the color sub-carrier frequency of the chrominance component of the reproduced video signals and said predetermined multiple of the line frequency, and means for applying said first, second and third signals to said frequency converting means so that the latter converts the color sub-carrier frequency of said separated chrominance component of the reproduced video signals to said predetermined fixed frequency irrespective of said color sub-carrier frequency as recorded.

2. An apparatus according to claim 1; in which said color video signals recorded on said record media are respectively NTSC and PAL video signals, said variable frequency oscillator has a central frequency intermediate the difference between the color sub-carrier frequency and said predetermined multiple of the line frequency of said NTSC video signals as recorded and the difference between the color sub-carrier frequency and said predetermined multiple of the line frequency of said PAL video signals as recorded, and said means controlling the variable frequency oscillator includes means for separating color burst pulses from said chrominance component of the reproduced video signals following the conversion of its color sub-carrier frequency by said frequency converting means and means comparing the frequency of said color burst pulses with said first signal of the predetermined fixed frequency and, in the event of any deviation therebetween, adjusting said variable frequency oscillator in the direction which varies the frequency of said third signal for eliminating said deviation.

3. An apparatus according to claim 2; in which said color sub-carrier frequencies of said NTSC and PAL video signals, as recorded on the respective record media, are $\frac{1}{2}(n-\frac{1}{2})f_{HN}$ and $\frac{1}{2}(n-\frac{1}{4})f_{HP}$, respectively, in which n is a positive integer and $f_{HN}$ and $f_{HP}$ are the line frequencies of said NTSC and PAL video signals, respectively; and in which said predetermined fixed frequency of said first signal is the standard color sub-carrier frequency with which said PAL video signals are transmitted.

4. An apparatus according to claim 3; in which said multiple is a positive integer which is approximately equal to $$\frac{f_{CN}-f_{CP}}{f_{HN}-f_{HP}}$$

in which $f_{CN}$ and $f_{CP}$ are respectively said color sub-carrier frequencies of said NTSC and PAL video signals as recorded on the respective record media.

5. An apparatus according to claim 1; in which each of said color video signals, as recorded, has said luminance component frequency modulated and said chrominance component frequency converted to have a color sub-carrier frequency substantially reduced in respect to the original color sub-carrier frequency thereof; and in which said predetermined fixed frequency of said first signal is substantially equal to said original color sub-carrier frequency of one of said color video signals.

6. An apparatus according to claim 5; in which said color video signals recorded on said record media are respectively NTSC and PAL color video signals, said color sub-carrier frequencies of said NTSC and PAL video signals, as recorded on the respective record media, are $\frac{1}{2}(n-\frac{1}{2})f_{HN}$ and $\frac{1}{2}(n-\frac{1}{4})f_{HP}$, respectively, in which $n$ is a positive integer and $f_{HN}$ and $f_{HP}$ are the line frequencies of said NTSC and PAL video signals, respectively; and in which said predetermined fixed frequency of said first signal is the standard color sub-carrier frequency with which said PAL video signals are transmitted.

7. An apparatus according to claim 6; in which said multiple is a positive integer which is approximately equal to $$\frac{f_{CN}-f_{CP}}{f_{HN}-f_{HP}}$$

in which $f_{CN}$ and $f_{CP}$ are respectively said color sub-carrier frequencies of said NTSC and PAL video signals as recorded on the respective record media.

8. An apparatus according to claim 5; in which said multiple is a positive integer that is approximately equal to the difference between said different color sub-carrier frequencies divided by the difference between said different line frequencies.

9. A method for selectively reproducing color video signals having luminance and chrominance components and which have been recorded on respective record media with different line frequencies and with different color sub-carrier frequencies for the respective chrominance components; comprising the steps of reproducing the color video signals recorded on a selected one of said record media, separating the luminance and chrominance components of the reproduced video signals, generating a first signal with a predetermined fixed frequency, generating a second signal with a frequency which is a predetermined multiple of said line frequency of the video signals being reproduced, generating a third signal with a frequency that is the difference between the color sub-carrier frequency of the chrominance component of the reproduced video signals and the frequency of said second signal, combining said first, second and third signals to provide a combined signal, and frequency converting the color sub-carrier frequency of said chrominance component of the reproduced video signals by means of said combined signal so that said color sub-carrier frequency is converted to said predetermined fixed frequency irrespective of said color sub-carrier frequency as recorded.

10. The method according to claim 9; in which each of said color video signals, as recorded, has said luminance component frequency modulated and said chrominance component frequency converted to have a color sub-carrier frequency substantially reduced in respect to the original color sub-carrier frequency thereof; and in which said predetermined fixed frequency of said first signal is selected to be substantially equal to said original color sub-carrier frequency of one of said color video signals.

11. The method according to claim 10; in which said color video signals recorded on said record media are respectively NTSC and PAL color video signals, said color sub-carrier frequencies of said NTSC and PAL video signals, as recorded on the respective record media, are $\frac{1}{2}(n-\frac{1}{2})f_{HN}$ and $\frac{1}{2}(n-\frac{1}{4})f_{HP}$, respectively, in which n is a positive integer and $f_{HN}$ and $f_{HP}$ are the line frequencies of said NTSC and PAL video signals, respectively; and in which said predetermined fixed frequency of said first signal is the standard color sub-carrier frequency with which said PAL video signals are transmitted.

12. The method according to claim 11; in which said multiple is a positive integer which is approximately equal to $$\frac{f_{CN}-f_{CP}}{f_{HN}-f_{HP}}$$

in which $f_{CN}$ and $f_{CP}$ are respectively said color sub-carrier frequencies of said NTSC and PAL video signals as recorded on the respective record media.

13. The method according to claim 10; in which said multiple is selected to be a positive integer approximately equal to the difference between said different color sub-carrier frequencies of the recorded color video signals divided by the difference between said different line frequencies of the respective recorded color video signals.

* * * * *